Figure 4:
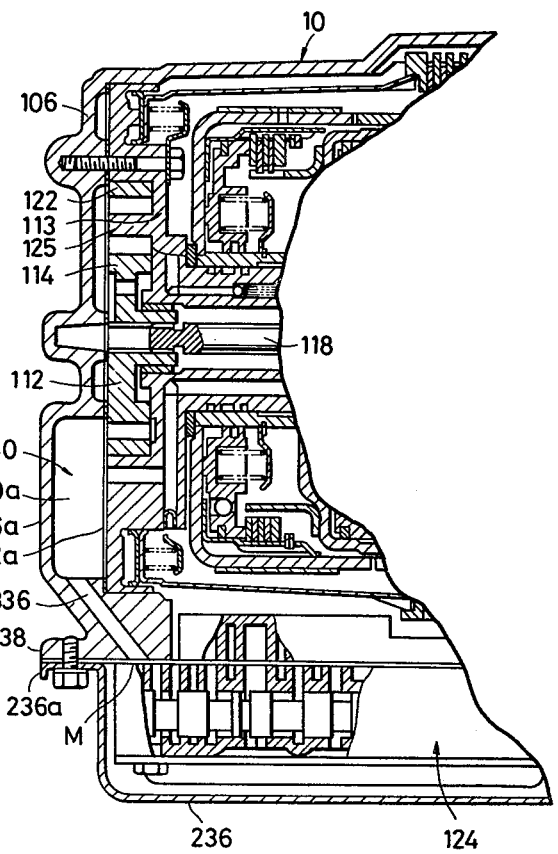

United States Patent [19]

Yamamori et al.

[11] 4,261,227
[45] Apr. 14, 1981

[54] AUTOMATIC TRANSMISSION FOR TRANSVERSE ENGINE OF FRONT-DRIVE AUTOMOTIVE VEHICLE

[75] Inventors: Takahiro Yamamori, Tokyo; Kazuyoshi Iwanaga; Kunio Ohtsuka, both of Yokohama, all of Japan

[73] Assignee: Nissan Motor Company, Limited, Yokohama, Japan

[21] Appl. No.: 947,219

[22] Filed: Sep. 29, 1978

[30] Foreign Application Priority Data

Sep. 18, 1978 [JP] Japan .......................... 53-128351[U]

[51] Int. Cl.³ ...................... F16H 37/08; F16H 57/02
[52] U.S. Cl. ................................... 74/695; 74/606 R
[58] Field of Search ................ 74/606 R, 695, 730, 74/732, 752 A, 752 C, 760

[56] References Cited

U.S. PATENT DOCUMENTS

| 2,740,304 | 4/1956 | Sheppard | 74/732 |
| 3,292,454 | 12/1966 | Konrad et al. | 74/695 |
| 3,747,730 | 7/1973 | Hause | 74/752 C |

FOREIGN PATENT DOCUMENTS 1455683  4/1969  Fed. Rep. of Germany ............ 74/732

Primary Examiner—Lawrence J. Staab
Attorney, Agent, or Firm—Thompson, Birch, Gauthier & Samuels

[57] ABSTRACT

A transmission case of an automatic transmission is formed with a fluid passage fluidly connecting a fluid pressure pump to a hydraulic control valve body for controllably operating a planetary gear system disposed in the case. The fluid passage is located adjacent a closed end of the transmission case and connected to control valve body in order to reduce the overall length of the transmission case in its axial direction.

8 Claims, 4 Drawing Figures

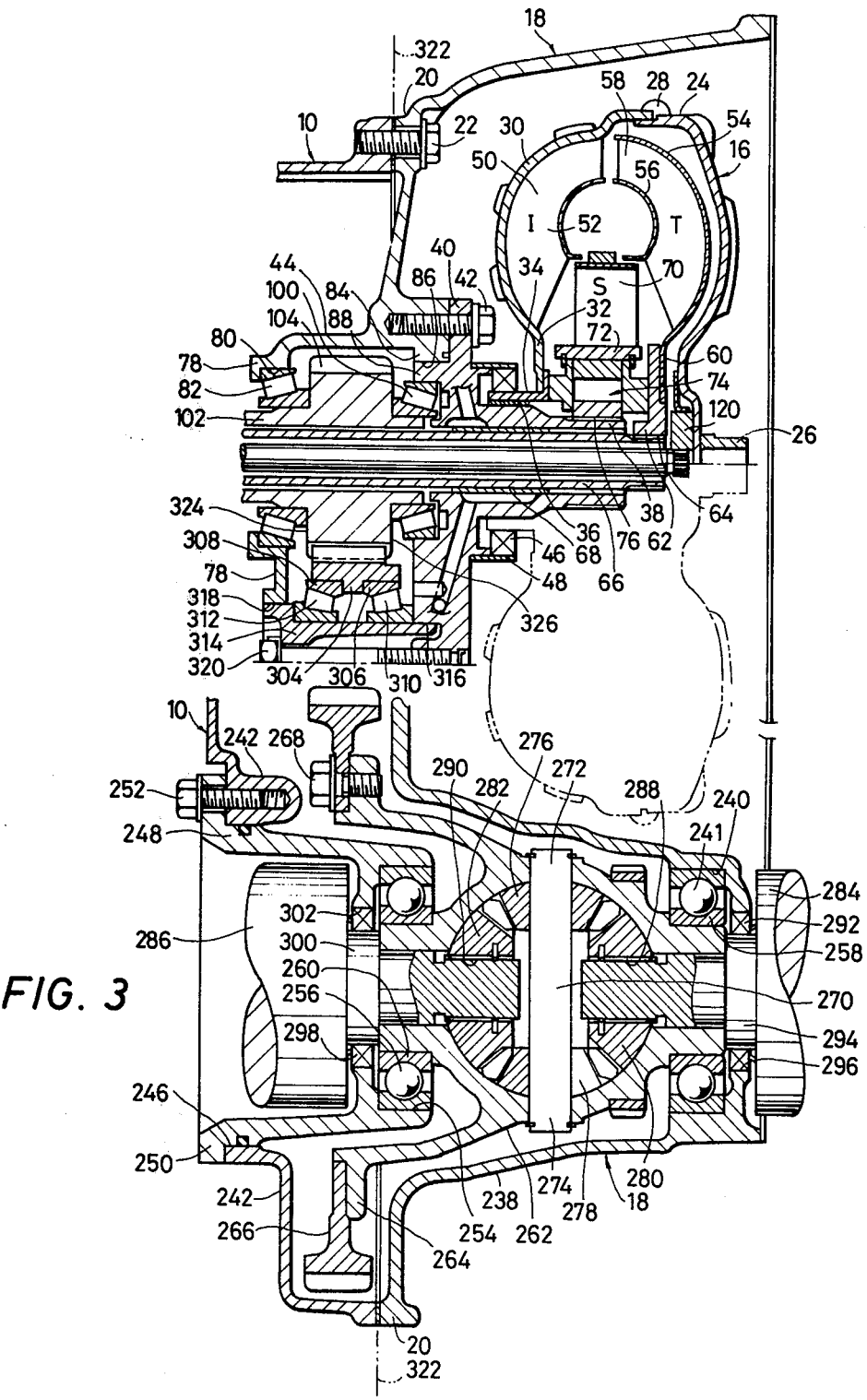

AUTOMATIC TRANSMISSION FOR TRANSVERSE ENGINE OF FRONT-DRIVE AUTOMOTIVE VEHICLE

The present invention relates in general to an improvement in a front-drive automatic transmission for a transverse engine of an automotive vehicle, and more particularly to a transmission case of the same transmission which case is shorter in its axial direction.

It is the principal object of the present invention to provide an improved automatic transmission which is shorter in its axial direction so that the transmission can be easily mounted with an engine on the chassis of a motor vehicle without causing any trouble during assembly of the vehicle.

It is another object of the present invention to provide an automatic transmission having an improved transmission case which is not formed with a projection which causes difficulty in mounting the transmission on the chassis of a motor vehicle.

It is a further object of the present invention to provide an automatic transmission having an improved transmission case by which a hydraulic control valve body and an oil pan covering the control valve body are located withdrawn from the end portion of the transmission case, preventing the flange portion of the oil pan from projecting from the end portion of the transmission case.

It is a still further object of the present invention to provide an automatic transmission having an improved transmission case in which a fluid passage connecting a fluid pressure pump and a hydraulic control valve body is formed and located to allow the overall length of the transmission case to be reduced in its axial direction.

Figure 1:
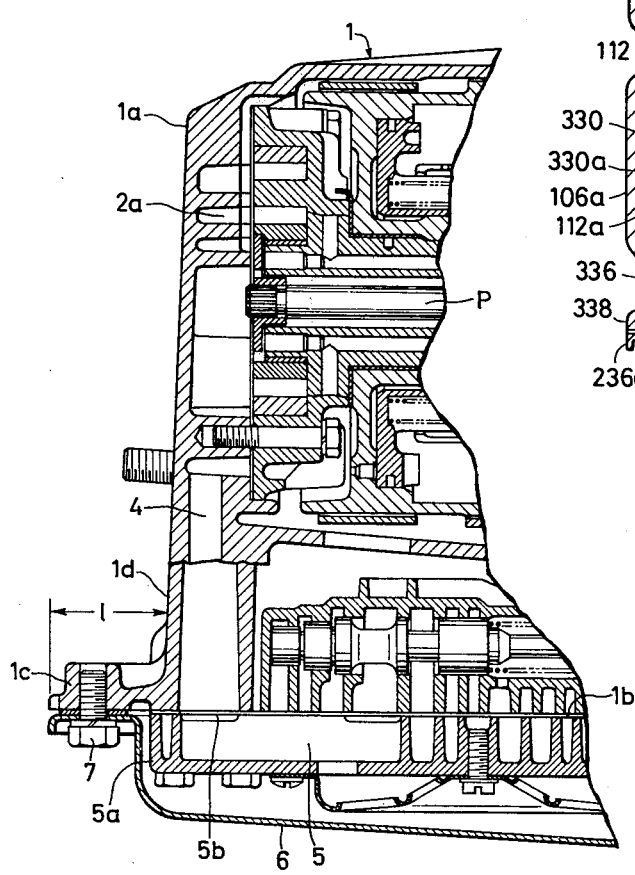

Other objects, features and advantages of the improved automatic transmission according to the present invention will be more apparent from the following description taken in conjunction with the accompanying drawings, in which FIG. 1 is a cross-sectional view of a portion of a prior art automatic transmission for a transverse engine in a front-drive system of a motor vehicle.

Figure 2A:
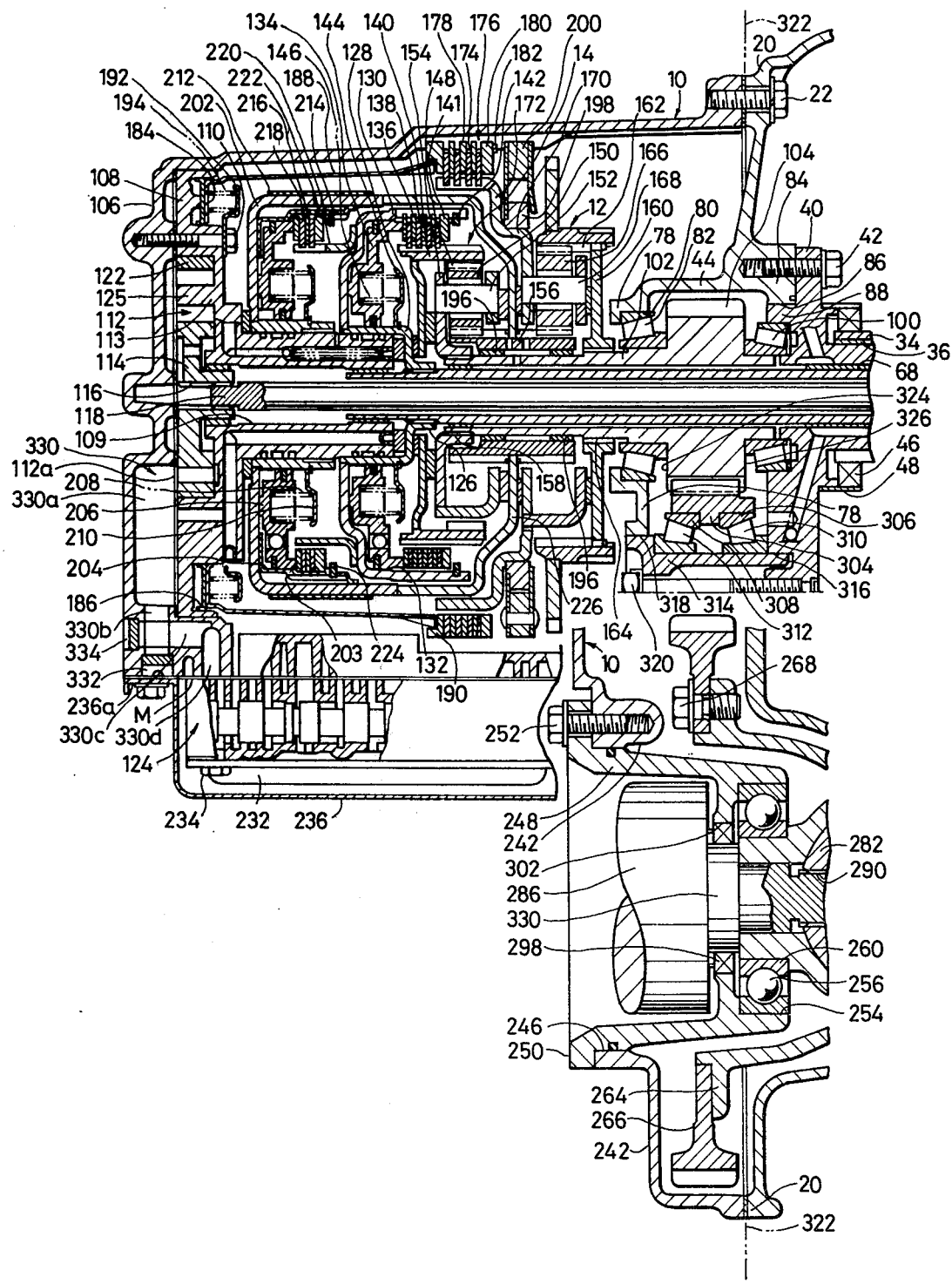

FIGS. 2(A) and 2(B) are cross sectional views which when assembled as a single composite along reference line 322, show an automatic transmission, in accordance with the present invention, for a transverse engine in a front-drive system of a motor vehicle;

FIG. 3 is a cross-sectional view of a differential in combination with the automatic transmission of FIG. 2; and FIG. 4 is a cross-sectional view of a portion of another embodiment of an automatic transmission in accordance with the present invention.

In a front-drive system there are known two methods of mounting an engine. One of them is to mount an engine longitudinally and the other is to mount an engine transversely. A transverse engine is advantageous in a front-drive system of an automotive vehicle, particularly a subcompact vehicle and a mini car, in terms of weight distribution between front and rear wheels and of space saving.

FIG. 1 shows a portion of the prior art Volkswagen 1600 transmission. This view was shown in ATZ Automobiltechnische Zeitschrift 69 (1967) 9 on page 286.

FIG. 1 shows an end portion of a prior art transmission case 1 of the transverse engine in a front-drive system, in which case a planetary gear system (no numeral) is disposed. An engine (not shown) is disposed at right-hand side of the transmission case in the drawing and is operatively connected to the planetary gear system, (not shown). Additionally, a hydrokinetic unit (not shown) or a so-called torque converter is operatively interposed between the planetary gear system and the engine. As shown, a fluid pressure pump 2 is securely located adjacent the closed end 1a of the transmission case 1. The fluid pressure pump 2 is operatively connected through a pump drive shaft P to the pump impeller of the torque converter and arranged to supply fluid under pressure through an upper fluid passage 3 and a lower fluid passage 4 to hydraulic control valve body 5. The control valve body 5 is secured to a flat surface 1b of the transmission case 1 to controllably supply th pressurized fluid from the pump 2 to the planetary gear system. The lower fluid passage 4 is formed by casting or by machining after casting so as to be located generally perpendicular to the flat surface 1b of the transmission case in which the control valve body 5 is secured. Accordingly, the lower end of lower fluid passage 4 necessarily lies outside or at left-hand side of the plane of the flat side surface 2a of the fluid pressure pump 2.

With such an arrangement, the left-most portion 5a of the control valve body 5 necessarily lies adjacent the closed end 1a of the transmission case 1 in order to connect the fluid passage 5b of the control valve body 5 to the lower fluid passage 4 of the transmission case 1. As a result, the closed end 1a of the transmission case must be provided with a flange portion 1c to which an oil pan 6 is secured with bolts 7. It is to be noted that the flange portion 1c of the transmission case 1 is therefore necessarily projected from an outer wall of the lower fluid passage 4 of the transmission case 1 by a length of l shown in FIG. 1. This increases the length of the automatic transmission itself in its axial direction by the length of l.

Such a long transmission in its axial direction is troublesome during the transverse mounting of the engine with the transmission on the chassis of a vehicle body. This is because the transverse dimension of the engine compartment of a vehicle is relatively small. Therefore, it is difficult to mount a transverse engine with such a long transmission on the vehicle body.

In view of the above, the present invention contemplates to overcome the problems encountered in the prior art automatic transmission for a transverse engine by improving the location of the lower fluid passage through which fluid under pressure from a fluid pressure pump is admitted to a hydraulic control valve body.

Referring now to FIGS. 2 and 3 of the accompanying drawings, there is shown a preferred embodiment of an automatic transmission for a transverse engine in a front-drive system of an automotive vehicle. Meant by the term "transverse engine" is an engine whose longitudinal axis is generally perpendicular to the longitudinal axis of a vehicle body (not shown). The automatic transmission comprises a generally cup-shaped transmission case 10 or a housing for a planetary gear system (no numeral). The gear system includes two planetary gear units 12 and 14 which establish the power flow paths as subsequentially will be explained.

A hydrokinetic torque converter unit is designated generally by reference numeral 16. It is enclosed within a housing 18 including an end flange 20 which may be secured to one end of transmission case by bolts 22 or any other suitable technique.

Although not shown, a crankshaft for the internal combustion engine may be bolted to a drive plate which is secured to an impeller shell part 24. The engine may be located at right-hand side of the housing 18, though not shown.

Impeller shell part 24 is generally toroidal in form and welded at its inner periphery to a pilot element 26.

The outer periphery of impeller shell part 24 is secured at 28 by welding or by any other suitable fastening technique to a second shell part 30. This shell part also is formed with a generally toroidal shape and its hub 32 is secured to a pilot sleeve shaft 34.

Sleeve shaft 34 is journaled by means of a bushing 36 upon a stationary sleeve shaft extension 38 of an adaptor 40. The adaptor is secured by means of bolts 42 to a housing portion 44 which forms a part of the torque converter housing 18. A suitable fluid seal 46 is situated between the sleeve shaft 34 and a surrounding opening of a ring 48 secured to the adaptor 40.

The impeller is identified in FIG. 2 by the symbol I. It includes blades 50 which are secured at their outer margins to the interior of the shell part 30. An inner shroud 52 is secured to the inner margins of the blades 50 thereby completing radial outflow passages. The flow exit region of the impeller is situated directly adjacent the flow entrance region of a turbine that is generally identified in FIG. 2 by the symbol T. The turbine includes an outer shroud 54, an inner shroud 56 and turbine blades 58 situated between the shrouds. Blades cooperate with the shrouds to define radial inflow passages.

The inner periphery 60 of the shroud 54 is secured to a hub 62. This hub in turn is internally splined at 64 to a power input shaft 66. Turbine shaft 66 is supported by means of a bushing 68 upon stationary sleeve shaft extension 38.

A bladed stator S is disposed between the flow exit region of the turbine and the flow entrance region of the impeller. It includes stator blades 70 carried by a stator shroud 72.

A one-way clutch designated by reference numeral 74 has its outer race secured within an opening of stator shroud 72 and its inner race splined at 76 to the stationary sleeve shaft 38. With the one-way clutch, rotation of the stator in a direction opposite to the direction of rotation of the impeller is prohibited although freewheeling motion in the other direction is accommodated.

Housing portion 44 includes an end wall 78 having a bearing opening 80 within which is situated a tapered roller bearing 82. The housing portion also includes a wall 84 having an opening 86 to receive a bearing retainer portion 88 of the adaptor 40. Another tapered roller bearing 100 is disposed within the retainer portion 88.

The inner races of the bearings 82 and 100 support a power output sleeve shaft 102. This shaft has a power output pinion or an output gear 104.

The left hand end of housing 10, as viewed in FIG. 2 has an end closure wall or generally circular closed end 106. Secured to the inner surface of the end wall 106 is an adaptor 108 having an axially extending sleeve shaft portion 109. The connection between adaptor 108 and end wall 106 can be made by bolts 110.

A fluid pressure pump 112 includes a housing 113. A pump inner gear 114 is disposed in the housing 113 and splined at 116 to a pump drive shaft 118. This shaft 118 extends through the center of sleeve shaft 66 and is keyed or splined at its right hand end, as viewed in FIG. 2, to a hub 120 secured to the inner periphery of the impeller shell part 24.

A pump outer gear 122 also received within the housing 113 meshes with pump inner gear 114 and cooperates with suitable ports to provide a control pressure source that is utilized by a control valve assembly or body designated generally by reference numeral 124. The reference numeral 125 indicates a crescent portion to which the teeth of gears 114 and 122 are in close proximity.

The power input shaft 66 is splined at 126 to a clutch member 128. This member includes a portion that surrounds the end of the axially extending sleeve shaft portion 109, a wall portion 129 radially extending from that surrounding portion and a radially extending portion that defines a drum 130 axially extending and joining to the wall portion. A portion of the inner periphery of the drum joining to the wall portion forms a cylinder 132, and it receives an annular piston 134. The drum 130 is splined to permit a splined connection with one or more externally splined clutch plates 136. Cooperating internally splined plates 138 are carried drivably by an externally splined clutch member 140. A clutch back-up plate 141 is also externally splined to the drum 130 and held axially fast by a snap ring 142.

Fluid pressure may be admitted to the working chamber defined by the piston 134 and the cylinder 132.

Member 128 carries a spring back-up element 144 and piston return springs 146 are situated between element 144 and the piston 134.

Clutch member 140 is integral with a ring gear 148 of the planetary gear unit 14. Ring gear 148 meshes with planet pinions 150 which are carried by pinion shafts 152. These shafts in turn are supported by a planetary carrier 154.

Pinions 150 mesh also with a sun gear 156. The sun gear is common to the planetary gear units 12 and 14.

Planetary carrier 154 is splined at 158 to the power output shaft 102.

A suitable torque transfer member 160 provides a drive connection between the power output shaft 102 and a ring gear 162 for the planetary gear unit 12. The torque transfer member has a splined central opening 164 within which the power output shaft 102 is splined. Ring gear 162 meshes with planetary pinions 166 which are rotatably supported by pinion shafts 168. A carrier 170 carries the pinion shafts 168 and is integral with a drum 172 which is splined to permit a splined connection with one or more internally splined plates 174 for a low and reverse brake designated generally by reference numeral 176. Cooperating externally splined plates 178 are splined to the housing 10. A brake back-up plate 180 is also externally splined to the housing 10 and held axially fast by a snap ring 182. The brake 176 may be applied and released by means of a piston 184 within a cylinder 186 formed in the adaptor 108. A motion transfer member 188 is provided to establish drive connection between the piston 184 and a pressure plate 190 externally splined to the housing 10.

Fluid pressure may be admitted to the working chamber defined by the piston 184 and the cylinder 186.

Adaptor 108 carries a spring back-up element 192 and piston return springs 194 and are situated between element 192 and the piston 184.

The common sun gear 156 is journaled upon the power output shaft 102 by means of two bushings 196. Carrier 170 carries an inner one-way clutch race 198 which is surrounded by a stationary outer race 200 splined to the housing 10. Spring loaded rollers (no numerals) are disposed between the inner and outer races 198 and 200. With one-way clutch races 198 and 200 and rollers, a one-way braking action for the drum 172 is provided free-wheeling one-way motion of the drum 172 relative to the housing 10 can be accommodated, however.

A brake drum assembly 202 having an outer drum 201 and an inner drum 203 fixed to the outer drum is rotatably supported upon the extension 109. The inner drum 203 defines an annular cylinder 204 within which is positioned an annular piston 206. Piston return springs 208 are situated between piston 206 and a spring seat member 210 which is held axially fast upon the hub of drum 202.

Drum assembly 202 is surrounded by an intermediate speed ratio brake band 212. This brake band can be applied and released by means of a suitable fluid pressure operated servo of conventional construction. A portion of the inner drum is splined as shown at 214 to permit a driving connection with externally splined clutch plates 216. Cooperating internally splined plates 218 are carried by an splined clutch member 220. The clutch member 220 is secured to the clutch member 128 for rotation in unison. A clutch pressure back-up plate 222 is externally splined to the inner drum 203 and held axially fast by a snap ring 224.

Upon introduction of pressure to the cylinder 204, a driving connection between drum assembly 202 and clutch member 220 will be established. Similarly, when fluid pressure is admitted to the cylinder 132, a driving connection is established between drum 130 and clutch member 140. Drum assembly 202 is drivably connected to the common sun gear 156 by means of a drive shell 226. The outer periphery of the drive shell 226 is welded to one end of the outer drum 201 of the drum assembly 202. The inner margin of the shell 226 is splined to the common sun gear 156 as indicated.

The transmission mechanism thus far described in connection with FIG. 2 is adapted to establish three forward driving speed ratios and a single reverse speed ratio.

The impeller of the hydrokinetic torque converter unit 16 is coupled directly to the engine so that a toroidal fluid flow in the torus circuit of the converter unit is established. Turbine torque then is delivered to shaft 66 and hence to clutch member 128. To establish a low speed drive ratio in automatic forward drive range (D), the forward clutch shown in part at 136 and 138 is engaged and the turbine torque is than transferred to the ring gear 148. The sun gear 156 tends to rotate in a backward direction relative to the direction of rotation of ring gear 148. This backward motion, however, causes a forward driving motion of ring gear 162 by reason of the fact that the carrier 170 forms a reaction element transmitting the torque reaction exerted by the one-way clutch shown in part at 198 and 200. The forward motion thus imparted to ring gear 162 is transferred directly to the power output shaft 102 through torque transfer member 160 and splined connection at 164.

The forward driving torque applied to the carrier 154 is transferred to the power output shaft 102 through splined connection 158. Thus the low speed ratio is characterized by a compounding of the two planetary gear units 12 and 14.

In manual low speed drive range (I), brake 176 is applied in addition to the engagement of the forward clutch, thereby anchoring carrier 170. By this anchoring, reverse torque reaction is provided during a hill braking or coasting condition.

To establish intermediate speed ratio, it merely is necessary to engage intermediate speed ratio brake band 212 in addition to the engagement of the forward clutch, thereby anchoring sun gear 156. The sun gear 156 therefore acts as a reaction member and a forward driving torque then is delivered to carrier 154 as the turbine drives the ring gear 148. The forward motion of the carrier 154, of course, is transferred as before to the power output shaft 102. Gear unit 12 is inoperative under these conditions and the one-way clutch shown in part at 198 and 200 will freewheel.

To establish direct drive high speed ratio, it merely is necessary to release brake band 212 and apply both clutches (high and reverse clutches, 216, 218, forward drive clutches 136, 138) simultaneously. This locks together the planetary gear units 12 and 14 so that they rotate in unison at one to one speed ratio.

Reverse drive is established by applying brake 176 and applying the high-and-reverse clutch (216 and 218). The forward clutch (136, 138) is released and brake band 212 is released. Turbine torque then is delivered to clutch member 220 and transferred directly to the sun gear 156 through drive shell 226. This causes the sun gear 156 to rotate in the direction of rotation of the impeller. Carrier 170, of course, is anchored by the brake 176 and acts as a reaction member. Ring gear 162 is then driven in a reverse direction and its reverse motion is transferred directly to the power output shaft 102 at a reduced speed ratio.

In addition to the above-discussed arrangement, the housing includes the transmission case 10 having an attachment flat surface M to which a valve cover 232 and the control valve assembly 124 are secured by means of bolts 234 (see FIG. 2). The attachment surface extends longitudinally from a location adjacent to end closure wall 106 to a location adjacent to that end of housing 10 to which housing 18 is secured.

The oil pan 236 is attached to transmission case 10 as shown in FIG. 2.

A final drive unit including differential is illustrated in FIG. 3. Housing 18 includes a housing portion 238 including a bearing opening 240 within which is situated a ball bearing 241. Housing or transmission case 10 includes a housing portion or wall 242 strengthened by one or more ribs (not shown). Wall 242 includes an opening 246 to receive a bearing retainer 248. This bearing retainer has at its outer periphery a flange 250 which is secured to wall 242 by means of bolts 252. It includes a bearing opening 254 within which situated is a ball bearing 256.

The inner races 258 and 260 of the bearings 241 and 256 support a differential case 262. Case 262 includes a flange 264 to which an externally toothed final reduction ring gear 266 is secured by means of bolts 268.

A pinion shaft 270 has one and opposite ends 272 and 274 fixed to case 262. A pair of pinions 276 and 278 are rotatably supported by pinion shaft 270. Each pinion meshes with side gears 280 and 282 for axle shafts 284 and 286, respectively. Side gear 280 includes a splined opening 288 within which axle shaft 284 is splined. Side gear 282 also includes a splined opening 290 within which axle shaft 286 is splined.

An oil seal 292 is situated between a reduced diameter section 294 of axle shaft 284 and an opening 296, formed in housing portion 238, surrounding the reduced diameter section. An oil seal 298 is situated between a reduced diameter section 300 and an opening 302, formed in bearing retainer 248, surrounding the reduced diameter section.

Torque is delivered from output gear 104 to ring gear 266 by means of a pinion or idler gear 304 meshing with output gear 104 and with the ring gear.

Referring to FIG. 2, idler gear 304 is supported by outer races 306 and 308 of tapered roller bearings 310 and 312. A bearing shaft 314 for supporting the bearings 310 and 312 has one end received in a blind bore 316 formed in adaptor 40 and an opposite end received in an opening 318 formed in end wall 78 of housing 18. Bearing shaft 314 is axially fast by a suitable means indicated at 320.

As will be readily understood from FIGS. 2 and 3, torque converter housing 18 and transmission case 10 are connected to each other to define an interface which lies on a plane, indicated by reference numeral 322, which is disposed outboard of the inboard face 324 of output gear 104 with respect to planetary gear units 12 and 14. A packing may be interposed between end flange 20 and the adjacent end of transmission case 10.

The attachment surface on housing portion 238 is extended up to a plane where the outboard face 326 of output gear 104 lies since this surface may be allowed to be extended, in design, to the end of transmission case 10 secured to flange 20 of torque converter housing 18 and, in this embodiment, the plane 322 where the interface lies is disposed adjacent the outboard face 326.

As will be understood from FIG. 3, housing portion 238 of torque converter housing 18 and wall 242 of transmission case 10 are connected to each other to define an interface which lies in the same plane 322. A packing may be interposed at the interface defined by the housing portion 238 and the wall 242.

The relationship between the fluid pressure pump 112 and the pressure control valve body 124 will be explained in detail hereinafter with reference to FIG. 2.

The fluid pressure pump 112 communicates through a fluid passageway 330 with the control valve body 124 in order to supply the control valve body 124 with fluid under pressure. The fluid under pressure is controllablly supplied to the planetary gear system disposed in the transmission case 10 to control the operation of the planetary gear system. The fluid passageway 330 includes first, second, third and fourth portions 330a, 330b, 330c and 330d. The first portion 330a is defined between a generally flat surface 112a of the fluid pressure pump 112 and the inner surface of the closed end 106 of the transmission case 10. The second portion 330b is formed through the wall of the transmission case 10 so that one end thereof directly opens to the first portion 330a and the other end thereof opens to ambient air, which other end is closed with a plug member 332. The second portion 330b is generally perpendicular to the surface M to which the control valve body 124 and the flange portion 236a of the oil pan 236 are secured. The third portion 330c is formed in the wall of the case 10 and generally perpendicularly to the second portion 330b so that one end thereof opens to ambient air, which one end is closed with a plug 334. The third portion 330c crosses the second portion 330b. The fourth portion 330d or an end fluid passage is formed in the casing 10 and perpendicularly to the third portion 330c so that one end thereof connects to the third portion 330c and the other end opens to ambient air through the flat surface M. After assembly, the fourth portion 330d opens to a portion of the flat surface M lying to the right-hand side of the flat surface 112a of the fluid pressure pump 112 in the drawing. The fourth portion 330d is produced upon casting of the transmission case 10 or by machining after casting of the same. The fourth portion 330d is in communication with a fluid receiving portion (not identified) of the control valve body 124, through which the fluid under pressure from the fluid pressure pump 112 is supplied to the interior of the control valve body 124.

With the thus arranged fluid passageway 330, the end fluid passage 330d is located inside of the extension (not shown) of the flat surface 112a of the fluid pressure pump 112 or opposite to the closed end 106 of the case 10 with respect to the extension of the flat surface 112a. Accordingly, the control valve body 124 can be laid inside of the flat surface 112a or at right hand side in the drawing. As a result, the oil pan 236 can be installed to the case 10 with bolts (not shown) so that the outer periphery of the flange portion 236a thereof lies on or withdrawn from an extension (not shown) of an outer wall 106a of the first fluid passage 330a. It will be appreciated from the foregoing, that the flange portion 1c of the transmission case of the prior art shown in FIG. 1 is omitted and therefore the overall length of the transmission is reduced by an amount corresponding to the length l shown in FIG. 1.

FIG. 4 illustrates a part of an alternative embodiment of the automatic transmission in accordance with the present invention. This embodiment is substantially similar to the embodiment shown in FIGS. 2 and 3 and, as such, like reference numerals are assigned to like parts and elements. Additionally, only a part different from the embodiment of FIGS. 2 and 3 is illustrated for the purpose of simplicity of description.

In this case, the fluid passageway 330 includes a first portion 330a, and a second portion 336 or an end fluid passage. The second portion 336 opens at one end thereof to the first portion 330a and opens at the other end thereof to the flat surface M to which the control valve body 124 and the flange portion 236a of the oil pan are secured. The second portion 336 is communicated through the flat surface M with a fluid receiving portion of the control valve body 124 through which fluid under pressure from the pump 112 is supplied to the control valve body 124. As shown, the second portion 336 is formed inclined to cross the extension (not shown) of the flat surface 112a of the fluid pressure pump 112. The second portion 336 may be produced upon casting of the transmission case 10. The transmission case 10 is formed at its bottom portion (in the drawing) with a flange portion 338 which extends form the closed end 106 of the transmission case 10, but does not extend beyond the vertical plane of the outer wall 106a of the first fluid passage 330a. The flange portion 338 is formed with a flat surface which lies on the extension of flat surface M of the case 10.

With the thus arranged fluid passageway 330, the control valve body 124 can be located inside or at righthand side (in the drawing) of the flat surface 112a of the fluid pressure pump 112. Therefore, when the flange portion 236a of the oil pan 236 is secured to the flange portion 338 of the transmission case 10, the outer-most periphery of the oil pan flange portion 236a can be laid on or withdrawn from the extension of the outer wall 106a of the first fluid passage 330a. As a result, the overall length of the transmission can be reduced by the amount corresponding to the length l shown in the prior art transmission of FIG. 1.

As is appreciated from the foregoing discussion, according to the present invention, since the automatic transmission is shortened in its axial direction and therefore mounting of the transverse engine with the automatic transmission on the chassis of the vehicle becomes easier during assembly of the vehicle having the front-drive system.

What is claimed is:

1. An automatic transmission including
a one piece generally cup-shaped transmission case having a generally circular closed end, said transmission case housing therein
a planetary gear system that includes planetary gear elements, a power input element of the planetary gear system being drivably connected to a hydorkinetic unit, a power output element of said planetary gear system having an output gear, the output gear being disposed between the planetary gear elements and the hydrokinetic unit, clutch means for connecting together two elements of the planetary gear system for rotation in unison, brake means for anchoring one element of the planetary gear system, fluid pressure operated servos for actuating the clutch means and the brake means, and a fluid pressure pump drivably connected to the hydrokinetic unit and located adjacent the circular closed end of the transmission case, said fluid pressure pump having a generally flat surface opposite to the inner surface of said circular closed end,
a control valve body in communication with the fluid pressure pump to supply selectively fluid pressure to the servos, the control valve body being secured to the transmission case and being located generally parallel with the axis of the transmission case, said transmission case having
fluid passageway means for fluidly connecting the fluid pressure pump to the control valve body and including an upstream portion which is located between the inner surface of said circular closed end and one side of a plane containing said flat surface, and an end portion which directly fluidly communicates with a fluid receiving portion of the control valve body which receives fluid under pressure from said pump, said end portion of said fluid passageway means being located on the opposite side of said plane.

2. An automatic transmission as claimed in claim 1, further comprising an oil pan for containing therein a fluid and covering the control valve body, said oil pan being formed with a flange portion secured to the transmission case, the periphery of said flange lying at a distance from said plane not greater than the distance of said circular closed end from said plane.

3. An automatic transmission as claimed in claim 2, in which said transmission case is formed with a flat surface to which the control valve body and the flange portion of said oil pan are secured.

4. An automatic transmission as claimed in claim 3, in which said fluid passageway means includes a first portion defined between the flat surface of the fluid pressure pump and the inner surface of the circular closed end of the transmission case, said first portion being communicable with the fluid pressure pump to define said upstream portion, a second portion connected to said first portion and lying generally perpendicular to the flat surface of said transmission case, a third portion connected to said second portion and lying generally perpendicular to said second portion, and a fourth portion connected to said third portion and lying perpendicular to the flat surface of said transmission case, said fourth portion being formed with said end portion of said fluid passageway so that said end portion lies on the flat surface of the transmission case.

5. An automatic transmission as claimed in claim 4, in which said second portion of said fluid means is produced by forming an elongate through-hole connecting said first portion to ambient air and thereafter plugging an open end of said through-hole, said third portion of said fluid passageway means is produced by forming a first elongate hole crossing said elongate throughhole and thereafter plugging an open end thereof, and said third portion of said fluid passageway is produced by forming a second elongate hole communicating at one end thereof with said first elongate hole, the other end thereof being opened on the flat surface of the transmission case.

6. An automatic transmission as claimed in claim 3, in which said fluid passageway means includes a first portion defined between the flat surface of the fluid pressure pump and the inner surface of the circular closed end of the transmission case, the first portion being communicable with the fluid pressure pump, and a second portion connected to said first portion, said second portion extending beyond the extension of the flat surface of the fluid pressure pump and reaching the flat surface of the transmission case, said second portion being formed with said end portion of said fluid passageway so that said end portion of said fluid passageway lies on the flat surface of the transmission case.

7. In an automatic transmission having a hydrokinetic unit, a planetary gear unit operatively connected to said hydrokinetic unit and a differential gear operatively connected to an output gear of said planetary gear unit via an idler gear,
a first housing unit having inverted first and second bell portions for receiving said hydrokinetic unit and said differential gear, respectively;
a second one piece housing unit having a third bell portion and a cover member extending from said third bell portion substantially at the level of the mouth thereof, said third bell portion receiving said planetary gear unit therein,
said first and second housing units being connectible so that said first bell portion is enclosed partially within said third bell portion,
said planetary gear unit having a pump located immediately adjacent the head of said third bell portion and a set of planetary gears disposed between said pump and the mouth of said third bell portion, said pump having a face adjacent to said cover member, said face lying in a plane having an inboard side facing said cover member and an outboard side facing said planetary gear unit,
a control valve unit disposed on the lower side of said third bell portion and enclosed by an oil pan having a peripheral flange which seats on a flat surface formed a said lower surface of said third bell portion, and
means defining a passage in said third bell portion which interconnects said pump and said control valve unit for feeding pressurized fluid from said pump to said control valve unit, said passage leading from inboard of a plane defined by the face of said pump immediately adjacent the head of said third bell portion, to cross said plane and communicate with said control valve unit on the outboard side of said plane so that sufficient space remains between the head of said third bell portion and the end of said control valve unit for said peripheral flange to be connected to said third bell portion without projecting beyond the head thereof.

8. In an automatic transmission having a hydrokinetic unit, a planetary gear unit operatively connected to said hydrokinetic unit and a differential gear operatively connected to an output gear of said planetary gear unit via an idler gear,
- a first housing unit having inverted first and second bell portions for receiving said hydrokinetic unit and said differential gear, respectively;
- a second one piece housing unit having a third bell portion and a cover member extending from said third bell portion substantially at the level of the mouth thereof, said third bell portion receiving said planetary gear unit therein,
- said first and second housing units being connectible so that the head of said first bell portion is enclosed partially within said third bell portion and said cover member closes the mouth of said second bell portion,
- said planetary gear unit having a pump located immediately adjacent the head of said third bell portion and a set of planetary gears disposed between said pump and the mouth of said third bell portion, said pump having a face adjacent to said cover member, said face lying in a plane having an inboard side facing said cover member and an outboard side facing said planetary gear unit,
- a control valve unit disposed on the lower side of said third bell portion and enclosed by an oil pan having a peripheral flange which seats on said lower surface of said third bell portion, and
- means for defining a passage in said third bell portion which establishes fluid communication between said pump and the area of the lower surface of said third bell portion which is bounded by said peripheral flange and which faces the interior of said oil pan, said passage leading from inboard of a plane defined by the face of said pump immediately adjacent the inner surface of the head of said third bell portion to cross said plane and communicate with the said area on the outboard side of said plane so that sufficient space remains between the head of said bell portion and the end of said control valve unit for said peripheral flange to be connected to said third bell portion without projecting beyond the head thereof.

* * * * *

UNITED STATES PATENT AND TRADEMARK OFFICE
CERTIFICATE OF CORRECTION

PATENT NO. : 4,261,227
DATED : April 14, 1981
INVENTOR(S) : Takahiro Yamamori et al It is certified that error appears in the above-identified patent and that said Letters Patent are hereby corrected as shown below:

In The Specification:

Col. 8, line 50, cancel "formed inclined to cross" and insert --oriented so that it extends at an acute angle across--.

In The Claims:

Col. 10, line 11, after "fluid" insert --passageway--;

line 18, cancel "third" and insert --fourth--;

line 18, after "passageway" insert --means--.

Signed and Sealed this

Eighteenth Day of August 1981

[SEAL]

Attest:

GERALD J. MOSSINGHOFF

*Attesting Officer*     *Commissioner of Patents and Trademarks*